2,886,889

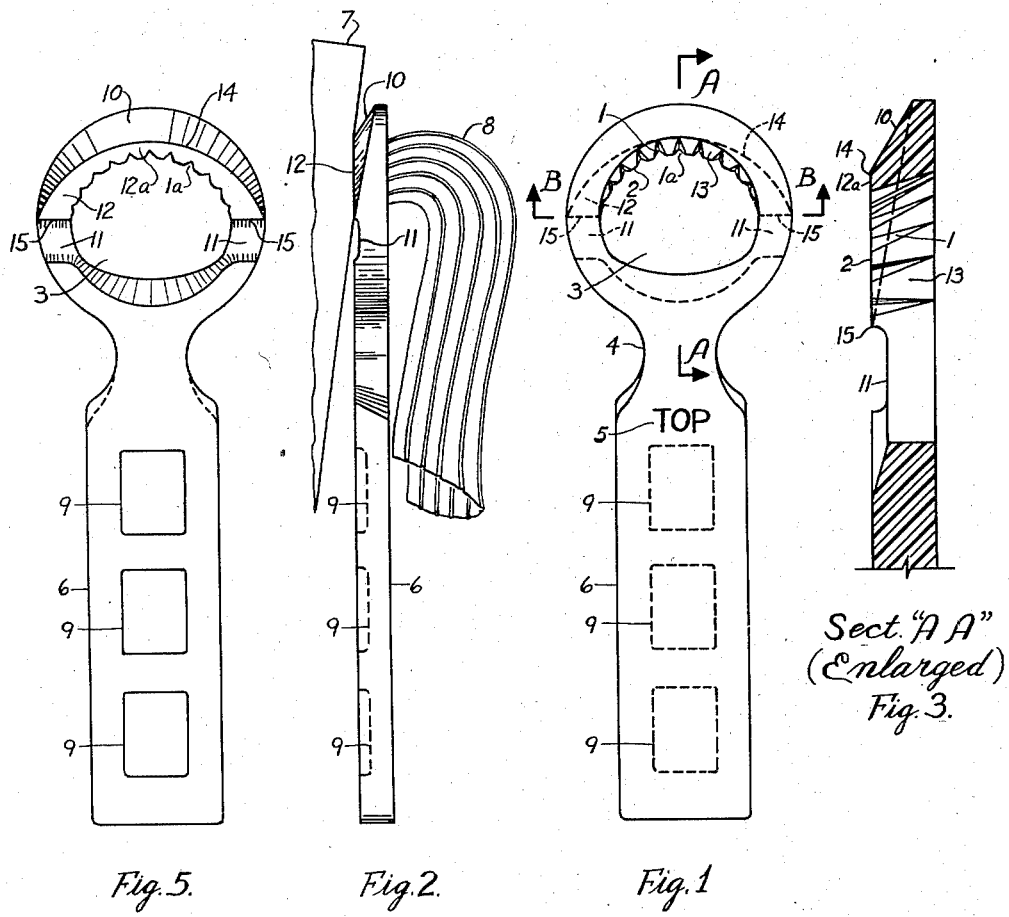
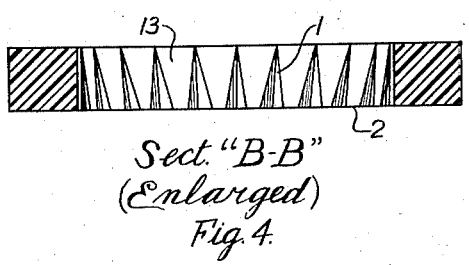

DEVICE TO FORM AND SHAPE BUTTER OR SUBSTANCES OF A SIMILAR CONSISTENCY OR NATURE INTO RIBBON-LIKE OR BALL-LIKE PORTIONS

Oswald T. Adamec and Gloria M. Shapiro, New York, N.Y., assignors to Adoria Corporation, New York, N.Y.

Application February 28, 1958, Serial No. 718,290

4 Claims. (Cl. 30—115)

This invention relates to a new and useful device for shaping butter, margarine and similar soft, pliable homogeneous substances into decorative straight or spiral strips.

A device in accordance with this invention is preferably made of one piece of molded plastic. The device can be held in the user's hand and by varying the angle at which it is used can produce the formation of designs and shapes by gliding along the surface of butter, margarine, shortenings or such foods or substances having a similar consistency or being of a similar nature, into either scalloped, grooved, ridged, ribbons or by alternating the process with a further downward movement into either scalloped, grooved, ridged shells, or balls almost circular in appearance.

This invention finds particular utility for butter and foods of a similar consistency or nature due to its economical use whereby in gliding the device over the surface of the bar of the substance, it scoops a small layer from said substance forming a design and shape of individual portions having the appearance of either scalloped, grooved, ridged ribbons or by alternating the process with a further downward movement into either scalloped, grooved, ridged shells or balls almost circular in appearance, and of whatever quantity desired. The choice of shape produced depends upon the angle at which the device is used.

The principal objects and advantages of this invention reside in the provision of it being a device which is simple and economical of construction enhancing the appearance of the food from its original state into one that is more appealing and appetizing.

The device is preferably made as one piece of molded plastic to provide a member having very light weight. Having no movable parts, it is simple and inexpensive to manufacture. It can be conveniently manufactured from materials such as lucite, nylon, plexiglass, styrene of varying colors to enhance its appearance, any one of these materials having the required strength for the purpose of this device. The advantage of its size is that multi-cavity molds may be used to effect further economy of manufacture.

The device is provided with serrations or a plurality of marginal tooth-like projections which serve to form design and shape of varying amounts of the substance used upon thereby making the individual portions larger or smaller as desired.

This results in an efficient accurate process thus avoiding waste and wherein such means are visible at all times.

It is further provided with finger grip indentations on each side in a convenient position for the user to firmly rest or grasp the device in his fingers in a comfortable position and avoid slippage during use.

The foregoing and such further objects and advantages as may appear or be pointed out as this description proceeds are contained in the structural embodiment illustrated in the accompanying drawing in which:

Figure 1 is a plan view looking down upon the device.
Figure 2 is a side elevation view.
Figure 3 is an enlarged section along lines A—A of Fig. 1 indicating cutting angles and relief bevels and serrated edges of this device.
Figure 4 is an enlarged transverse section taken along lines B—B of Fig. 1 showing the tapered teeth pointing towards the apex.
Figure 5 is a partial bottom view of the device illustrating the bearing surface, the recessed surface and the sloped surface.
Figure 6 is an upper fragmentary perspective view of the central portion of the surface 13 with the notches 1.

Referring now to the drawing, the device is one piece, no movable parts, 9 has recesses to lighten weight without lessening the strength of device resulting in a more economical construction and inexpensive to manufacture. Multi-cavity molds may be used to effect further economy of manufacture.

The serrations 1 or a plurality of marginal tooth like projections, pointing forward toward the apex as shown in Figure 1, have the function to form the various shapes 8 of the 7 substance used, being aided by 2 the forming edge. The opening 3 permits the shaped 8 and formed substance to pass 3 through a specifically shaped opening in the device. The substance is now formed in its final stage 8 as indicated by drawing in Figure 2. Reverting now to the handle 6 this is provided with semi circular indentations 6, on each side, preferably inclined, which is allowable for the user conveniently resting or gripping the fingers in a comfortable position to avoid slippage during use and to facilitate the gliding process of converting bars of substances described into the various shapes described. The member is used with the stamped or molded word 5 "top" directing the user to commence the operation properly.

The device embodies a beveled edge 10 which insures bite into substance being used. The beveled edge or surface 10 intersects the bearing surface 12 to form the curved edge 14. The recessed area 11 further insuring the bite into the substance but at the same time, reducing the friction to a minimum degree as shown in Fig. 3 and thereby causing the formation of a smooth symmetrical shape. The recessed surface or area 11 intersects the bearing surface 12 to form edges 15 on opposite sides of the opening 3.

The notches have walls extending transversely and intersecting the bearing surface to form openings 1a in the bearing surface and an edge therewith. The notches also form openings in the transverse surface. The walls close the notches opposite the openings so that the rib-like material passes up through the notched openings 1a, through the passage formed by the walls and then out through the opening in the transverse surface. The edge formed by the intersection of the transverse surface and the bearing surface is intersected by the notches to form the edge intersections.

More specifically the flat bearing surface 12 positioned between the conical or beveled edge or surface 10 and the recessed surface 11 rests on the body of the substance to remove the top layer in a strip form. The bearing surface forms a large bearing area to receive the applied pressure and not penetrate into the body of the substance. In the ring shaped embodiment the surface 12 is generally crescent in shape due to the intersection with the beveled surface 10. The surface is wide at each end and narrows at the center. The center portion 12a provides a substantial bearing area to prevent penetration into the substance.

The surface 13 containing the serrations or notches 1 is transverse to the bearing surface 12 and may be normal to the surface 12 or at a slight angle from the normal. As illustrated in this embodiment the surface 13 is at a slight angle from the normal to the surface 12. The serrations or notches extend substantially the entire width of the surface 13 and form openings 1a in the bearing surface 12. As seen in the drawings the area of the notch opening is small in comparison to the area of the bearing surface 12.

As illustrated in Fig. 2 the device is drawn across the substance in a direction generally parallel to the surface 12 so that the surface 13 is generally normal to the direction of movement. The layer of the substance engages the surface 13 and is turned up along the surface out through the opening. The substance is forced into the notches to form a rib-like portion on the strip of substance formed.

Thus it will readily be seen that in the operation of this device, the desired portion of butter or similar substance used is arrived at by pulling the device, once it is in contact with the area, and the cutting edge simultaneously forming and shaping the butter or said substance into individual portions having the appearance of either scalloped, grooved, ridged ribbons or by alternating the process with a further downward movement into either scalloped, grooved, ridged shells or balls almost circular in appearance.

It is further apparent that this device is effective in operation.

It is believed that the operation and using of our invention has been fully described and disclosed in the above description of our invention.

Having thus described our invention and illustrated its use what we claim as new and desire to secure by Letters Patent is:

1. A device for forming from soft, pliable homogeneous substances, such as butter or the like, thin strips with longitudinally extending rib-like portions spaced across the width of the strip, said device comprising a generally thin, flat ring-shaped member having a generally flat bearing surface on the bottom side thereof for pressing the member on the body of the substance, an opening extending transversely through the member and having a curved inner surface transverse to said flat bearing surface and intersecting said flat bearing surface for engaging a thin layer of the substance to separate the layer from the body of the substance, said inner surface having notches extending tranversely to said member and spaced along said inner surface, said notches having walls extending progressively deeper into said member as the walls extend towards the bearing surface and intersecting the bearing surface to form notch openings therein for receiving the soft, pliable substance to form rib-like portions on the surface of the separated layer, said inner surface guiding the separated layer up through the opening to form a continuous strip of homogeneous substance with laterally spaced rib-like portions extending longitudinally along the strip.

2. A device as set forth in claim 1 wherein said inner surface is at an angle less than 90° to the bearing surface at the intersection of said inner surface and said bearing surface.

3. A device as set forth in claim 1 wherein recess means are provided in the bottom of said member on the leading side of said bearing surface to terminate said bearing surface and to space said member from the homogeneous substance.

4. A device for forming from soft, pliable homogeneous substances, such as butter or the like, thin strips with longitudinally extending rib-like portions spaced across the width of the strip, said device comprising a member with a bearing surface, on the bottom side thereof for pressing the device on the body of the substance and with a surface transverse to said bearing surface and extending down to the bearing surface for engaging a thin layer of the substance to separate the layer from the body of the substance, said transverse surface having wall portions extending inwardly to form a plurality of spaced closed notches, said wall portions extending down and intersecting said bearing surface to form a plurality of spaced openings therein for receiving the soft, pliable substance to form on the surface of the strip rib-like portions passing up through the notches as the strip is formed and guided by the transverse surface to make a continuous strip with laterally spaced rib-like portions extending longitudinally along the strip.

References Cited in the file of this patent

UNITED STATES PATENTS

| 577,074 | Seitz | Feb. 16, 1897 |
| 2,610,399 | Adams et al. | Sept. 16, 1952 |